(12) United States Patent
Diwakaran (10) Patent No.: US 11,271,987 B1
(45) Date of Patent: Mar. 8, 2022

(54) UNIVERSAL WEBHOOK CONNECTIVITY VIA MULTI-STEP HTTP TRANSFORMATION

(71) Applicant: Digital.ai Software, Inc., Burlington, MA (US)

(72) Inventor: Umakanthan Diwakaran, Chennai (IN)

(73) Assignee: Digital.ai Software, Inc., Burlington, MA (US)

( * ) Notice: Subject to any disclaimer, the term of this patent is extended or adjusted under 35 U.S.C. 154(b) by 0 days.

(21) Appl. No.: 17/105,499

(22) Filed: Nov. 26, 2020

(51) Int. Cl.
  *H04L 67/02* (2022.01)
  *G06F 9/54* (2006.01)
  *H04L 67/147* (2022.01)
  *H04L 67/55* (2022.01)

(52) U.S. Cl.
  CPC ............. *H04L 67/02* (2013.01); *G06F 9/547* (2013.01); *H04L 67/147* (2013.01); *H04L 67/26* (2013.01)

(58) Field of Classification Search
  CPC ....... H04L 67/02; H04L 67/147; H04L 67/26; G06F 9/547
  See application file for complete search history.

(56) References Cited

U.S. PATENT DOCUMENTS

2011/0320550 A1* 12/2011 Lawson ............... G06F 9/542 709/206
2015/0373097 A1* 12/2015 Konkus ............... H04L 67/142 709/203
2017/0366416 A1* 12/2017 Beecham ............... H04L 45/50
2018/0115595 A1* 4/2018 Krishnan ............... H04L 67/02
2019/0196890 A1* 6/2019 Bucchi ............. G06F 16/24545
2019/0306167 A1* 10/2019 LaManna ............... H04L 63/10

(Continued)

FOREIGN PATENT DOCUMENTS

CA  3060362 A1 * 2/2019 ........... G06F 16/958
WO  WO-2018039264 A1 * 3/2018 ............... G06N 5/04

OTHER PUBLICATIONS

Qiu, Xiangbin; "A Publish-Subscribe System for Data Replication and Synchronization Among Integrated Person-Centric Information Systems," Utah State University. (Year: 2010).*

(Continued)

*Primary Examiner* — Alina A Boutah
(74) *Attorney, Agent, or Firm* — Rahman LLC (57) ABSTRACT

A method for synchronization of a publishing web-application and subscriber web-applications is provided. The method includes (a) registering a hypertext transfer protocol (HTTP) message subscription associated with (i) an event that occurs on the publishing web-application and (ii) an HTTP message of the publishing web-application sent to the subscriber web-application at the event, (b) generating a transformed HTTP message using the HTTP message subscription which is created by (i) generating an extended web URL by augmenting a web URL associated with the HTTP message subscription with an HTTP method identifier, (ii) transforming a payload associated with the HTTP message from a format of the publishing web-application to a format of the subscriber web-application using payload mapping, and, (iii) augmenting the extended web URL by appending a variable with the payload, wherein the variable includes identifier information associated with a data entity.

20 Claims, 7 Drawing Sheets

(56) References Cited

U.S. PATENT DOCUMENTS

| | | | |
|---|---|---|---|
| 2020/0169562 A1* | 5/2020 | Moldoveanu | H04L 63/0807 |
| 2020/0401465 A1* | 12/2020 | Douglas | G16H 40/00 |
| 2021/0271726 A1* | 9/2021 | Trainor | G06F 16/9538 |
| 2021/0385292 A1* | 12/2021 | Lowe | H04L 63/08 |

OTHER PUBLICATIONS

REST API Extensions, Bonitasoft, S.A. (Year: 2021).*

\* cited by examiner

REGISTERING A HYPERTEXT TRANSFER PROTOCOL (HTTP) MESSAGE SUBSCRIPTION ASSOCIATED WITH (A) AN EVENT THAT OCCURS ON THE PUBLISHING WEB-APPLICATION AND (B) AT LEAST ONE HTTP MESSAGE OF THE PUBLISHING WEB-APPLICATION TO THE AT LEAST ONE SUBSCRIBER WEB-APPLICATION AT THE EVENT

402

GENERATING A TRANSFORMED HTTP MESSAGE FROM THE HTTP MESSAGE USING THE HTTP MESSAGE SUBSCRIPTION ASSOCIATED WITH THE EVENT

404

THE METHOD COMPRISES GENERATING AN EXTENDED WEB URL BY AUGMENTING A WEB URL ASSOCIATED WITH THE HTTP MESSAGE WITH AN HTTP METHOD IDENTIFIER

406

TRANSFORMING THE PAYLOAD FROM A FORMAT OF THE PUBLISHING WEB-APPLICATION TO A FORMAT OF THE AT LEAST ONE SUBSCRIBER WEB-APPLICATION USING PAYLOAD MAPPING

FIG. 5

UNIVERSAL WEBHOOK CONNECTIVITY VIA MULTI-STEP HTTP TRANSFORMATION

BACKGROUND

Technical Field

The embodiments herein generally relate to techniques for synchronization of a publishing web-application and a subscriber web-application.

Description of the Related Art

Application integration is a vast space where most applications have their functionality exposed as representational state transfer (REST) application programming interface (API). The REST APIs traditionally communicate over a hypertext transfer protocol (HTTP) or hypertext transfer protocol secure (HTTPS), in JavaScript® object notation (JSON) format and follow HTTP verbs for various actions such as a "POST" for create, "PUT" for update, and "PATCH" for partial updates. In today's world of REST APIs, webhooks have evolved as a method of choice for synchronization and integration. A webhook is a method of augmenting or altering the behavior of a web page or web application with custom callbacks. The synchronization is not uniform as the custom callbacks are required to be maintained, modified, and managed by third-party users and developers who may not necessarily be affiliated with the originating website or application.

Further, there are many products in the application lifecycle management and developer operations space and a client typically has multiple applications servicing their needs. Invariably, the applications need to be integrated with each other. Though the applications have webhooks support, where webhooks also follow a paradigm of the REST, the applications are still unable to communicate with each other and hence are unable to synchronize in a uniform way. For a message that is triggered when an event occurs at a first application and is sent to a second application, a format for the message at second application may be different from the format of the message for the first application. From the perspective of a developer that develops synchronization between multiple applications, variations in the format of the message makes it difficult to achieve synchronization between the first application and the second application in a uniform and simple way. For example, for a 'create' event of a data entity, the second application typically might have an API to create a similar data entity, but is unable to do so as the format at the second application is different. Similarly, for an 'update' event of the data entity, not only is the format difference an issue, a typical update request on the second application must be a PUT or a PATCH. Furthermore, for updates, one must also augment a uniform resource locator (URL) with an identifier of the object to PUT or PATCH. However, most webhooks implementations only deliver a POST. This leads to either of two possible solutions: (a) using a third-party adapter framework, or (b) developing a custom adapter for each application. Both solutions require extra effort to be maintained, modified, and managed by third-party users and developers. Further they also add to computational complexity and fail to achieve synchronization in a uniform and simple way.

Accordingly, there arises a need to address the aforementioned technical drawbacks in existing technologies for synchronization of multiple applications in a uniform way.

SUMMARY

In view of the foregoing, there is provided one or more non-transitory computer-readable storage medium that stores one or more sequence of instructions, which when executed by a processor, causes synchronization of a publishing web-application and a subscriber web-application, the sequence of instructions include, (a) registering a hypertext transfer protocol (HTTP) message subscription that is associated with (i) an event that occurs on the publishing web-application and (ii) an HTTP message of the publishing web-application sent to the subscriber web-application at the event; (b) generating a transformed HTTP message from the HTTP message using the HTTP message subscription associated with the event, wherein the HTTP message subscription is created by (i) generating an extended web URL by augmenting a web URL associated with the HTTP message subscription with an HTTP method identifier, (ii) transforming a payload associated with the HTTP message from a first format of the publishing web-application to a second format of the subscriber web-application using payload mapping, and, (iii) augmenting the extended web URL by appending a variable with the payload; and (c) transmitting the transformed HTTP message from the publishing web-application to the subscriber web-application to invoke an API for synchronization of the publishing web-application and the subscriber web-application. Transmitting the transformed HTTP messages results in synchronization of the publishing web-application and the subscriber web-application in a uniform way. The variable includes identifier information associated with a data entity that comprises a set of data configured to be stored and accessed on a computer-readable medium.

In some embodiments, the non-transitory computer readable storage medium storing the sequence of instructions, which when executed by the processor further causes in-order transmission of a plurality of transformed HTTP messages based on a subscription group that comprises at least one HTTP message subscription to form an integration between the publishing web-application and a plurality of subscriber web-applications, wherein the plurality of subscriber web-applications receive the transformed HTTP messages from the subscription group.

In some embodiments, the HTTP message subscription is further created by over-writing the subscription group HTTP header that is associated with the subscription group with the subscription HTTP header that is associated with the HTTP message subscription.

In some embodiments, the HTTP message subscription is further created by over-writing either the subscription group HTTP header or the subscription HTTP header with the message HTTP header that is associated with the HTTP message.

In some embodiments, the non-transitory computer readable storage medium storing the sequence of instructions, which when executed by the processor, further applies a filter that is configured in the HTTP message subscription associated with the event to either the HTTP header or the payload to deliver a transformed HTTP message that qualifies the filter to the subscriber web-application.

In some embodiments, the non-transitory computer readable storage medium storing the sequence of instructions, which when executed by the processor further creates the data entity at the subscriber web-application upon determining that the data entity is created at the publishing web-application.

In some embodiments, the non-transitory computer readable storage medium storing the sequence of instructions, which when executed by the processor further updates the data entity at the subscriber web-application upon determining that the data entity is updated at the publishing web-application.

In some embodiments, registering the HTTP message subscription is performed either by using a web-UI to visually configure the HTTP message subscription, or by using an application programming interface (API).

In some embodiments, the non-transitory computer readable storage medium storing the sequence of instructions, which when executed by the processor further invokes an endpoint of a representational state transfer application programming interface (REST API) by implementing the HTTP message subscription as a webhook subscription configuration to universally connect the subscriber web-application and the publishing web-application.

In another aspect, there is provided a transformed message configuration device that causes synchronization of a publishing web-application and subscriber web-application. The transformed message configuration device includes a processor and a memory that stores set of instructions, which when executed by the processor, causes to perform the steps of (a) registering a hypertext transfer protocol (HTTP) message subscription that is associated with (i) an event that occurs on the publishing web-application and (ii) an HTTP message of the publishing web-application sent to the subscriber web-application at the event; (b) generating a transformed HTTP message from the HTTP message using the HTTP message subscription associated with the event, wherein the HTTP message subscription is created by (i) generating an extended web URL by augmenting a web URL associated with the HTTP message subscription with an HTTP method identifier, (ii) transforming a payload associated with the HTTP message from a first format of the publishing web-application to a second format of the subscriber web-application using payload mapping, and, (iii) augmenting the extended web URL by appending a variable with the payload, wherein the variable includes identifier information associated with a data entity that comprises a set of data configured to be stored and accessed on a computer-readable medium; and (c) transmitting the transformed HTTP message from the publishing web-application to the subscriber web-application to invoke an API for synchronization of the publishing web-application and the subscriber web-application. Transmitting the transformed HTTP messages results in synchronization of the publishing web-application and the subscriber web-application in a uniform way. The transformed message configuration device may be an electronic device, a computer a processing device or a server.

In some embodiments, the transformed message configuration device further causes in-order transmission of a plurality of transformed HTTP messages based on a subscription group that comprises at least one HTTP message subscription to form an integration between the publishing web-application and a plurality of subscriber web-applications, wherein the plurality of subscriber web-applications receive the transformed HTTP messages from the subscription group.

In some embodiments, the transformed message configuration device creates the HTTP message subscription by over-writing the subscription group HTTP header that is associated with the subscription group with the subscription HTTP header that is associated with the HTTP message subscription.

In some embodiments, the transformed message configuration device creates the HTTP message subscription by over-writing either the subscription group HTTP header or the subscription HTTP header with the message HTTP header that is associated with the HTTP message.

In some embodiments, the transformed message configuration device applies a filter that is configured in the HTTP message subscription associated with the event to either the HTTP header or the payload to deliver a transformed HTTP message that qualifies the filter to the subscriber web-application.

In yet another aspect, an embodiment herein provides a method of synchronization of a publishing web-application and subscriber web-application. The method includes (a) registering a hypertext transfer protocol (HTTP) message subscription that is associated with (i) an event that occurs on the publishing web-application and (ii) an HTTP message of the publishing web-application sent to the subscriber web-application at the event; (b) generating a transformed HTTP message from the HTTP message using the HTTP message subscription associated with the event, wherein the HTTP message subscription is created by (i) generating an extended web URL by augmenting a web URL associated with the HTTP message subscription with an HTTP method identifier, (ii) transforming a payload associated with the HTTP message from a first format of the publishing web-application to a second format of the subscriber web-application using payload mapping, and, (iii) augmenting the extended web URL by appending a variable with the payload, wherein the variable includes identifier information associated with a data entity that comprises a set of data configured to be stored and accessed on a computer-readable medium; and (c) transmitting the transformed HTTP message from the publishing web-application to the subscriber web-application to invoke an API for synchronization of the publishing web-application and the subscriber web-application. Transmitting the transformed HTTP messages results in synchronization of the publishing web-application and the subscriber web-application in a uniform way.

In some embodiments, the method further includes transmitting a plurality of transformed HTTP messages in-order based on a subscription group that comprises at least one HTTP message subscription to form an integration between the publishing web-application and a plurality of subscriber web-applications, wherein the plurality of subscriber web-applications receive the transformed HTTP messages from the subscription group.

In some embodiments, the HTTP message subscription is further created by over-writing the subscription group HTTP header that is associated with the subscription group with the subscription HTTP header that is associated with the HTTP message subscription.

In some embodiments, the HTTP message subscription is further created by over-writing either the subscription group HTTP header or the subscription HTTP header with the message HTTP header that is associated with the HTTP message.

In some embodiments, the method further includes creating the data entity at the subscriber web-application upon determining that the data entity is created at the publishing web-application.

In some embodiments, the method further includes updating the data entity at the subscriber web-application upon determining that the data entity is updated at the publishing web-application.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for synchronization of a publishing web-application and a subscriber web-application. As used herein the term. Referring now to the drawings, and more particularly to FIGS. 1 to 6, where similar reference characters denote corresponding features consistently throughout the figures, there are shown preferred embodiments.

Figure 1:
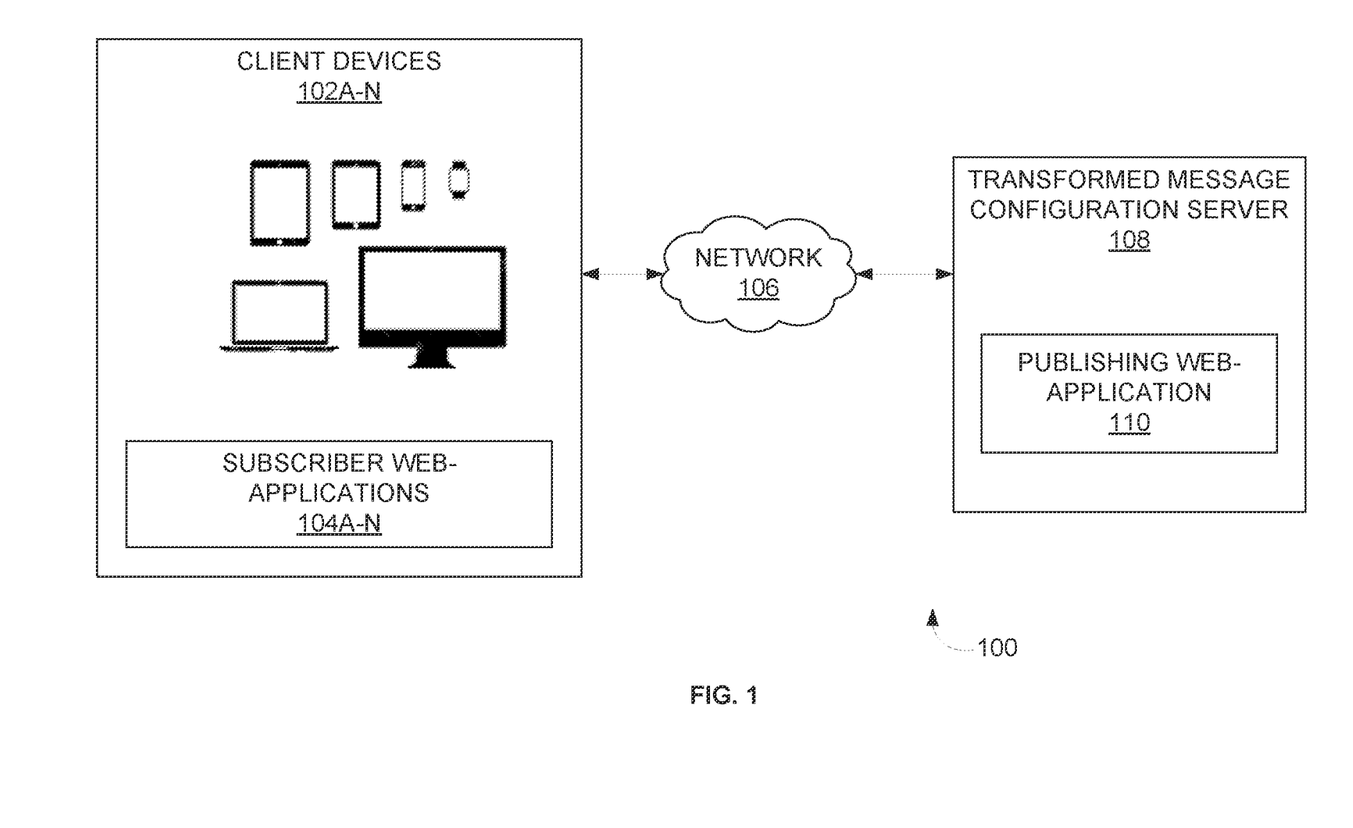
FIG. 1 illustrates a system for synchronization of a publishing web-application and one or more subscriber web-applications, according to some embodiments herein.

FIG. 1 illustrates a system 100 for synchronization of a publishing web-application 110 and one or more subscriber web-applications 104A-N (where N is a positive integer), according to some embodiments herein. The system 100 includes one or more client devices 102A-N (where N is a positive integer) that comprise the one or more subscriber web-applications 104A-N that is connected via a network 106 to a transformed message configuration server 108 that comprises the publishing web-application 110. The transformed message configuration server 108 may be configured to register a hypertext transfer protocol (HTTP) message subscription associated with (a) an event that occurs on the publishing web-application and (b) an HTTP message of the publishing web-application sent to the subscriber web-application at the event. The transformed message configuration server 108 may be configured to generate a transformed HTTP message from the HTTP message using the HTTP message subscription associated with the event. The HTTP message subscription is created by: (i) generating an extended web URL by augmenting a web URL associated with the HTTP message subscription with an HTTP method identifier, (ii) transforming a payload associated with the HTTP message from a format of the publishing web-application to a format of the subscriber web-application using payload mapping, and, (iii) augmenting the extended web URL by appending a variable with the payload, the variable includes identifier information associated with a data entity. The transformed message configuration server 108 may be configured to transmit the transformed HTTP message from the publishing web-application to the subscriber web-application to invoke an application programming interface (API) for synchronization of the publishing web-application and the subscriber web-application. The data entity includes a set of data which is capable of being stored and accessed on a computer-readable medium and may include, but not be limited to an epic, a story, a defect, a task. The story or user story is a software system requirement that is expressed in a few short sentences, ideally using non-technical language. The epic is a large user story that can be broken down into a number of smaller stories. The task represents a technical activity, like designing a diagram, coding a functionality, testing a device, or preparing dataset. The defect is a variance between expected results and actual results of execution of test case on the system. In some embodiments, the data entity may include, but not be limited to, a text, an audio, a video, a web URL, a data structure and a data-table. The HTTP method identifier is an identifier of a set of request methods that indicate a desired action to be performed for a given web URL. The HTTP method identifier may include, but not be limited to, "GET", "HEAD POST", "PUT", "DELETE", "CONNECT", "OPTIONS", "TRACE", "PATCH".

Figure 2:
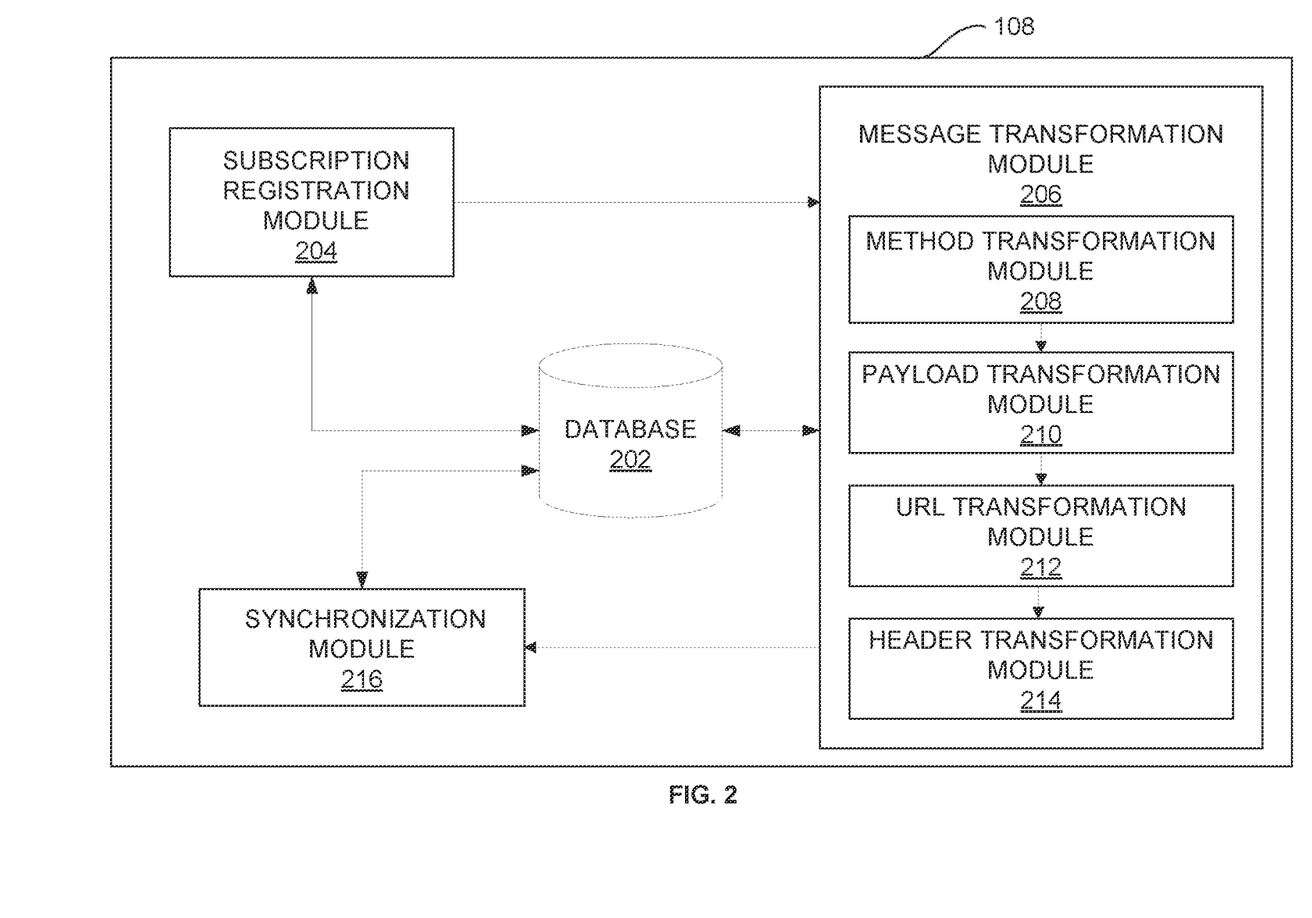
FIG. 2 illustrates an exploded view of a transformed message configuration server of FIG. 1, according to some embodiments herein.

FIG. 2, with reference to FIG. 1, illustrates an exploded view of the transformed message configuration server 108 of FIG. 1, according to some embodiments herein. The transformed message configuration server 108 comprises a database 202, a subscription registration module 204, a message transformation module 206 that further comprises a method transformation module 208, a payload transformation module 210, a URL transformation module 212, a header transformation module 214 and a synchronization module 216. The subscription registration module 204 may be configured to register a hypertext transfer protocol (HTTP) message subscription associated with an event that occurs at the publishing web-application to deliver a HTTP message that includes a payload through a web URL from the publishing web-application to the subscriber web-application. The message transformation module 206 may generate a transformed HTTP message from the HTTP message using the HTTP Message subscription associated with the event.

The method transformation module 208 may generate an extended web URL by augmenting the web URL with an HTTP method. Traditionally, the web URL is prefixed by a protocol, such as "http://localhost" and "https://www-.google.com". The method transformation module 208 augments the web URL by including the HTTP method as well. In some embodiments, the method transformation module 208 may augment the web URL by prefixing the HTTP method, such as, "PUT:https://jira.server.net".

A format of the message for the publishing web-application 110 may be different from the format of the message of the one or more subscriber web-applications 104A-N. The payload transformation module 210 may transform the payload from the format of the publishing web-application 110 to a format of the one or more subscriber web-applications 104A-N using payload mapping. In an embodiment, the format may be of a JavaScript object notation (JSON) and the payload transformation module 210 may use a JavaScript mapper that may be associated with the HTTP message subscription. One or more fields associated with the JSON may have a different meaning depending on the one or more subscriber web-applications 104A-N or the publishing web-application 110, such as a field "status" may be a number in a first subscriber web-application and may be a "development in progress" in a second subscriber web-application. One or more assignments from the JSON may be used to transform the HTTP message and may be augmented by a full-featured Ecma Script (ES) 5 compliant JavaScript engine. In an exemplary embodiment, a first variable "$inmessage" may include an incoming payload and a second variable "$outmessage" may include an outgoing payload and the second variable may be set to the incoming payload by default and no payload transformation of the HTTP message may occur. The URL transformation module 212 may augment the extended web URL by appending a variable with the payload. The variable includes identifier information associated with a data entity that includes a set of data which is capable of being stored and accessed on a computer-readable medium. In an exemplary embodiment, a special variable "$param" is used to augment the extended web URL so that a transformed extended web URL is used for transmitting the transformed HTTP message, so that during the actual invocation of the API, the web URL is transformed such that the transformed extended web URL includes an identifier. The transformed extended web URL may enable the synchronization to be performed specifically for a data entity such as a JIRA Defect. The synchronization module 216 may deliver the transformed HTTP message from the publishing web-application to the subscriber web-application to invoke an API for synchronization of the publishing web-application and the subscriber web-application.

In an embodiment, the synchronization module 216 may perform in-order transmission of a plurality of transformed HTTP messages based on a subscription group that includes at least one HTTP message subscription to form an integration between the publishing web-application and a plurality of subscriber web-applications. The plurality of subscriber web-applications receive the transformed HTTP messages from the subscription group.

The header transformation module 214 may be configured to further create the HTTP message subscription by performing a header transformation of the HTTP message. The header transformation may be performed by over-writing the subscription group HTTP header that is associated with the subscription group with at least one subscription HTTP header that is associated with the HTTP message subscription. Further, the header transformation may include overwriting either the subscription group HTTP header or the subscription HTTP header with the message HTTP header that is associated with the HTTP message. The header transformation may be implemented using a hierarchical implementation that may have one or more levels of hierarchy. The one or more levels of hierarchy may include, in order of high priority, three levels including the subscription group, the HTTP message subscription and the HTTP message. Key-value pairs associated with at least one HTTP header at any of the three levels override key-value pairs associated with at least one HTTP header at a previous level. The one or more levels of hierarchy enables defining headers at an application level, while overriding them at the HTTP message subscription level. In an exemplary embodiment, when an "authorization token" is defined at a subscriber web-application level, all API endpoint invocations contain the "authorization token". If "authorization token" is not defined anywhere, any incoming "authorization token" will be passed as is, that enables an invocation of the transformed HTTP message to use a security profile as dictated by the source. Defining "authorization token" at a first HTTP message subscription enables overriding of the "authorization token" specifically for the first HTTP message subscription alone. This provides the capability to change the security profile for a specific invocation within the subscriber web-application level permissions. Optionally, the header transformation module 214 may encapsulate either credentials of a user of the one or more subscriber web-applications 104A-N or specific headers by wrapping the web URL in a first API associated with the transformed message configuration server 108.

In an embodiment, the subscription registration module 204 may apply a plurality of filters that are configured in the HTTP message subscription associated with the event to either the HTTP header or the payload to deliver a transformed HTTP message that qualifies the filter to the subscriber web-application.

In an embodiment, the synchronization module 216 may create the data entity at the subscriber web-application upon determining that the data entity is created at the publishing web-application. Further, the synchronization module 216 may update the data entity at the subscriber web-application upon determining that the data entity is updated at the publishing web-application.

In an embodiment, the subscription registration module 204 may register the HTTP message subscription either by using a web-UI to visually configure the HTTP message subscription, or by using an API endpoint.

In an embodiment, the synchronization module 216 may invoke an endpoint of a representational state transfer application programming interface (REST API) by implementing the HTTP message subscription as a webhook subscription configuration to universally connect the subscriber web-application and the publishing web-application.

Figure 3:
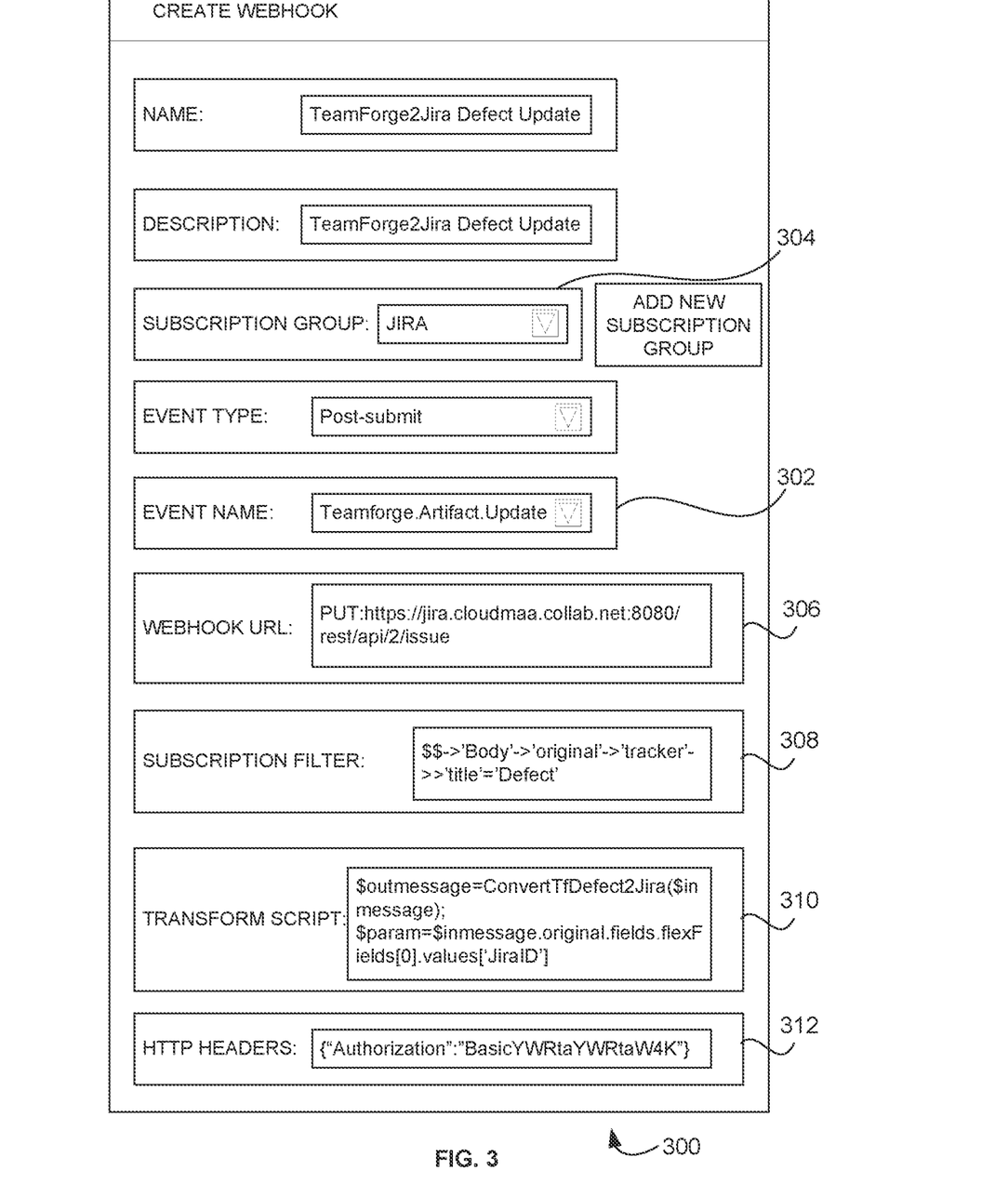
FIG. 3 illustrates an example web-based user interface view for visually configuring an HTTP message subscription, according to some embodiments herein.

FIG. 3, with reference to FIGS. 1 and 2, illustrates an example web-based user interface (UI) view 300 for visually configuring an example webhook subscription configuration, according to some embodiments herein. The example web-based UI view 300 includes an event name space 302, a subscription group space 304, a webhook URL space 306, a subscription filter space 308, a transform script space 310, and a HTTP headers space 312. The example webhook subscription configuration is called "TeamForge2Jira Defect Update" to deliver the HTTP message that includes the payload through the web URL from "TeamForge" to "Jira", where "TeamForge" is the publishing web-application and "Jira" is a subscriber web-application. The event name space 302 is used to configure the event or an event of interest. The example webhook subscription configuration is associated with an event "TeamForge.Artifact.Update" that occurs at the publishing web-application "TeamForge". The subscription group space 304 may be used to configure a subscription group that comprises one or more HTTP message subscriptions. The subscription group may be used for performing in-order transmission of the plurality of transformed HTTP messages. The webhook URL space 306 is used to configure a webhook URL that may be the extended web URL. In the example webhook subscription configuration, the HTTP method is augmented by prefixing the HTTP method on the web URL as: "PUT:https://jira.cloudmaa.collab.net:8080/rest/api/2/issue". The subscription filter space 308 is used to configure the plurality of filters that qualify either a HTTP header or the payload by applying a plurality of filters that are configured in the example webhook subscription configuration that is associated with the event to filter the HTTP message. In the example webhook subscription configuration, the plurality of filters is configured as "$$→'Body'→'original'→'tracker'→'title'='Defect'". In an embodiment, one or more fully qualified filters as well as one or more content-based filters may be specified that act on each of the HTTP header and payload. The one or more fully qualified filters and the one or more content-based filters may not be restricted to a specific HTTP header. The transform script space 310 is used to configure a transform script that is associated with payload mapping. The transform script is used to transform the payload from the format of the publishing web-application 110 to the format of the one or more subscriber web-applications 104A-N. In the example webhook subscription configuration, the transform script is configured as: "$outmessage=ConvertTfDefect2Jira($inmessage); $param=$inmessage.original.fields.flexFields[0].values['JiraID']".

In an embodiment, one or more special syntax extensions enable complete transformation of the payload by using re-usable transformation functions. Variable "$param", which may be an in-built parameter may also take a value in the example webhook subscription configuration. The variable "$param" may be used to augment the web URL with an identifier that may be needed for issuing an update call associated with the one or more subscriber web-applications 104A-N. The HTTP headers space 312 is used to configure one or more HTTP headers. In the example webhook subscription configuration, the one or more HTTP headers are configured as: "{"Authorization": "BasicYWRtaYWRtaW4K"}" which may be a token required for authorization at the one or more subscriber web-applications 104A-N.

Figure 4A:
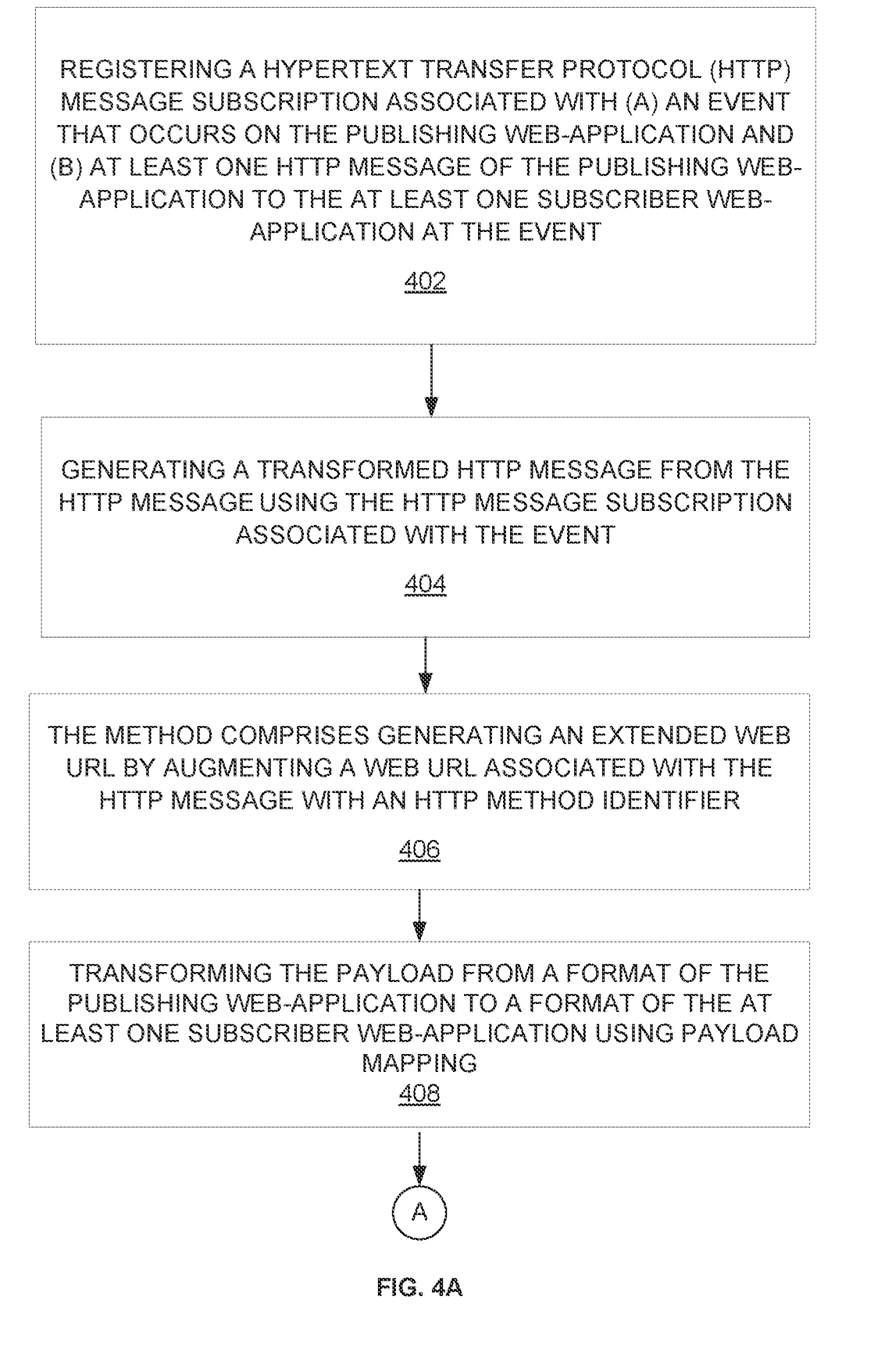
FIGS. 4A and 4B are flow diagrams of a method for synchronization of a publishing web-application and the one or more subscriber web-applications, according to some embodiments herein.
Figure 4B:
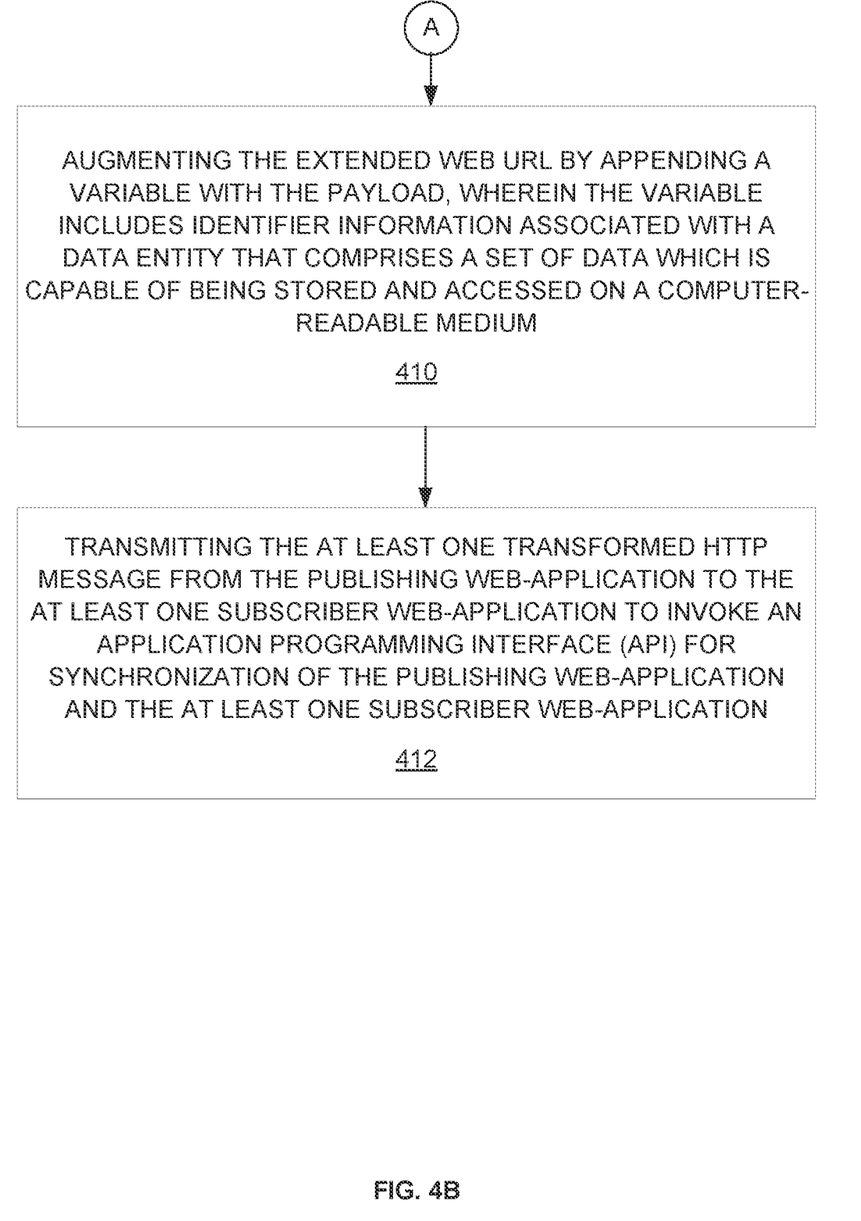

FIGS. 4A and 4B, with reference to FIG. 1 through 3, are flow diagrams of a method for synchronization of the publishing web-application 110 and the one or more subscriber web-applications 104A-N, according to some embodiments herein. At step 402, the method comprises registering a hypertext transfer protocol (HTTP) message subscription associated with (a) an event that occurs on the publishing web-application and (b) a HTTP message of the publishing web-application sent to the subscriber web-application at the event. At step 404, the method comprises generating a transformed HTTP message from the HTTP message using the HTTP message subscription associated with the event. At step 406, the method comprises generating an extended web URL by augmenting a web URL associated with the HTTP message subscription with an HTTP method identifier. At step 408, the method comprises transforming a payload associated with the HTTP message from a format of the publishing web-application to a format of the subscriber web-application using payload mapping. At step 410, the method comprises augmenting the extended web URL by appending a variable with the payload, wherein the variable includes identifier information associated with a data entity that comprises a set of data which is capable of being stored and accessed on a computer-readable medium. At step 412, the method comprises transmitting the transformed HTTP message from the publishing web-application to the subscriber web-application to invoke an API for synchronization of the publishing web-application and the subscriber web-application.

Figure 5:
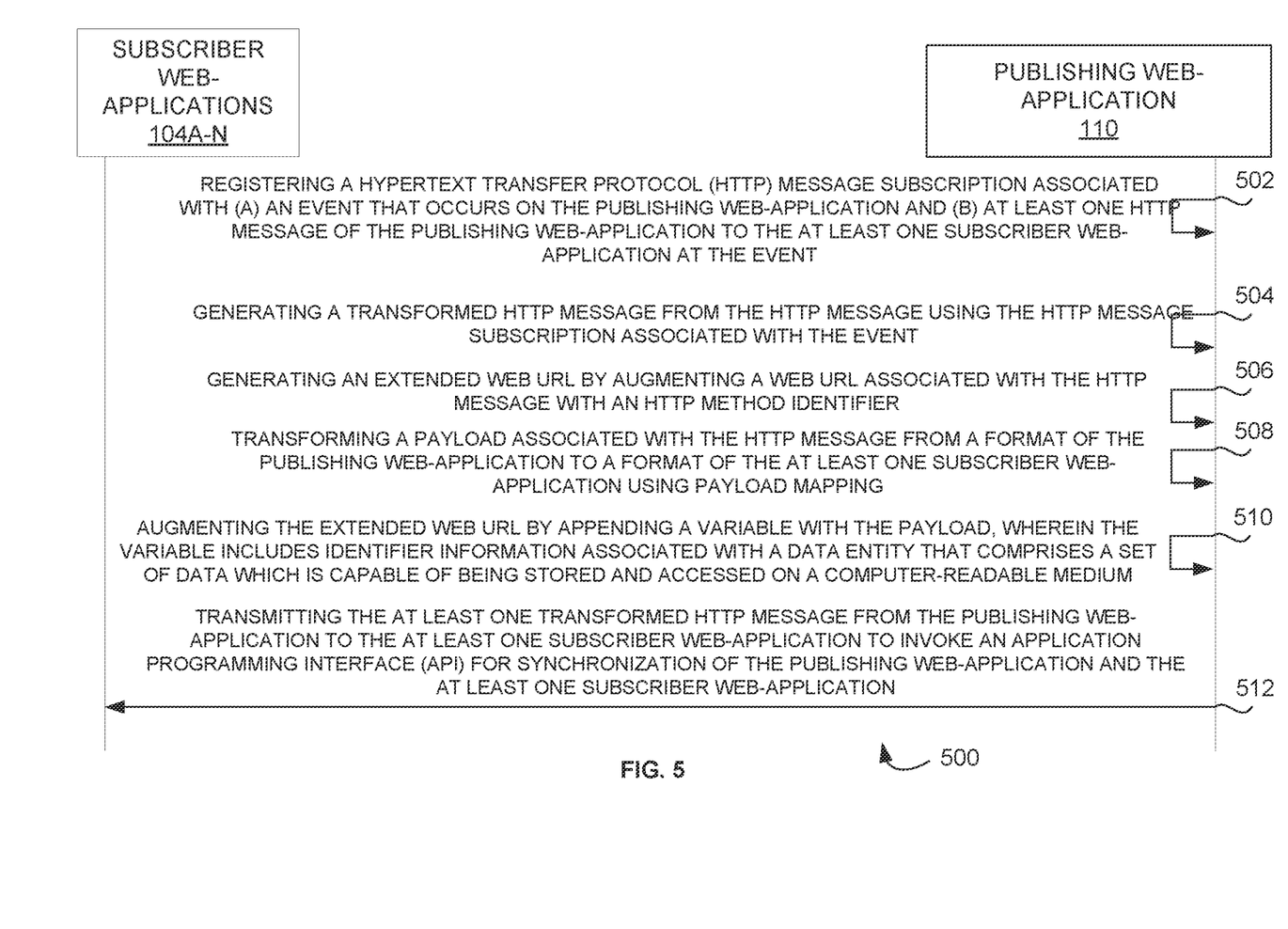
FIG. 5 is an interaction diagram of a method for synchronization of a publishing web-application and the one or more subscriber web-applications, according to some embodiments herein.

FIG. 5, with reference to FIGS. 1 through 4B, is an interaction diagram 500 of the method for synchronization of the publishing web-application 110 and the one or more subscriber web-application 104A-N, according to some embodiments herein. At step 502, a hypertext transfer protocol (HTTP) message subscription associated with (a) an event that occurs on the publishing web-application and (b) a HTTP message of the publishing web-application sent to the subscriber web-application at the event is registered. At step 504, a transformed HTTP message is generated from the HTTP message using the HTTP Message subscription associated with the event. At step 506, an extended web URL is generated by augmenting a web URL associated with the HTTP message subscription with an HTTP method identifier. At step 508, a payload associated with the HTTP message is transformed from a format of the publishing web-application to a format of the subscriber web-application using payload mapping. At step 510, the extended web URL is augmented by appending a variable with the payload. The variable includes identifier information associated with a data entity that comprises a set of data which is capable of being stored and accessed on a computer-readable medium. At step 512, the transformed HTTP message is transmitted from the publishing web-application to the subscriber web-application to invoke an API for synchronization of the publishing web-application and the subscriber web-application.

In an exemplary embodiment, the HTTP message subscription may be used to generate an enhanced vocabulary of one or more webhooks based on a first pseudo code used by the one or more subscriber web-applications 104A-N and a second pseudo code used by the publishing web-application 110. The first pseudo code may include:
Send
Event=EventX
To-URL=URLY
If filters match
   Method=create/update/delete
ToFormat=Format-Y
The second pseudo code may include:
   POST/PATCH/PUT EventX data
To URLY
   If Data matches
filters
   In Format-Y
The enhanced vocabulary of the one or more webhooks may be used to universally connect the subscriber web-application and the publishing web-application.

The various systems and corresponding components described herein and/or illustrated in the figures may be embodied as hardware-enabled modules and may be a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The systems that include electronic circuits process computer logic instructions capable of providing digital and/or analog signals for performing various functions as described herein.

The various functions can further be embodied and physically saved as any of data structures, data paths, data objects, data object models, object files, database components. For example, the data objects could include a digital packet of structured data. Example data structures may include any of an array, tuple, map, union, variant, set, graph, tree, node, and an object, which may be stored and retrieved by computer memory and may be managed by processors, compilers, and other computer hardware components. The data paths can be part of a computer CPU or GPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be physical locations in computer memory and can be a variable, a data structure, or a function. Some examples of the modules include relational databases (e.g., such as Oracle® relational databases), and the data objects can be a table or column, for example. Other examples include specialized objects, distributed objects, object-oriented programming objects, and semantic web objects. The data object models can be an application programming interface for creating HyperText Markup Language (HTML) and Extensible Markup Language (XML) electronic documents. The models can be any of a tree, graph, container, list, map, queue, set, stack, and variations thereof, according to some examples. The data object files can be created by compilers and assemblers and contain generated binary code and data for a source file. The database components can include any of tables, indexes, views, stored procedures, and triggers.

In an example, the embodiments herein can provide a computer program product configured to include a pre-configured set of instructions, which when performed, can result in actions as stated in conjunction with various figures herein. In an example, the pre-configured set of instructions can be stored on a tangible non-transitory computer readable medium. In an example, the tangible non-transitory computer readable medium can be configured to include the set of instructions, which when performed by a device, can cause the device to perform acts similar to the ones described here.

The embodiments herein may also include tangible and/or non-transitory computer-readable storage media for carrying or having computer-executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network. If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
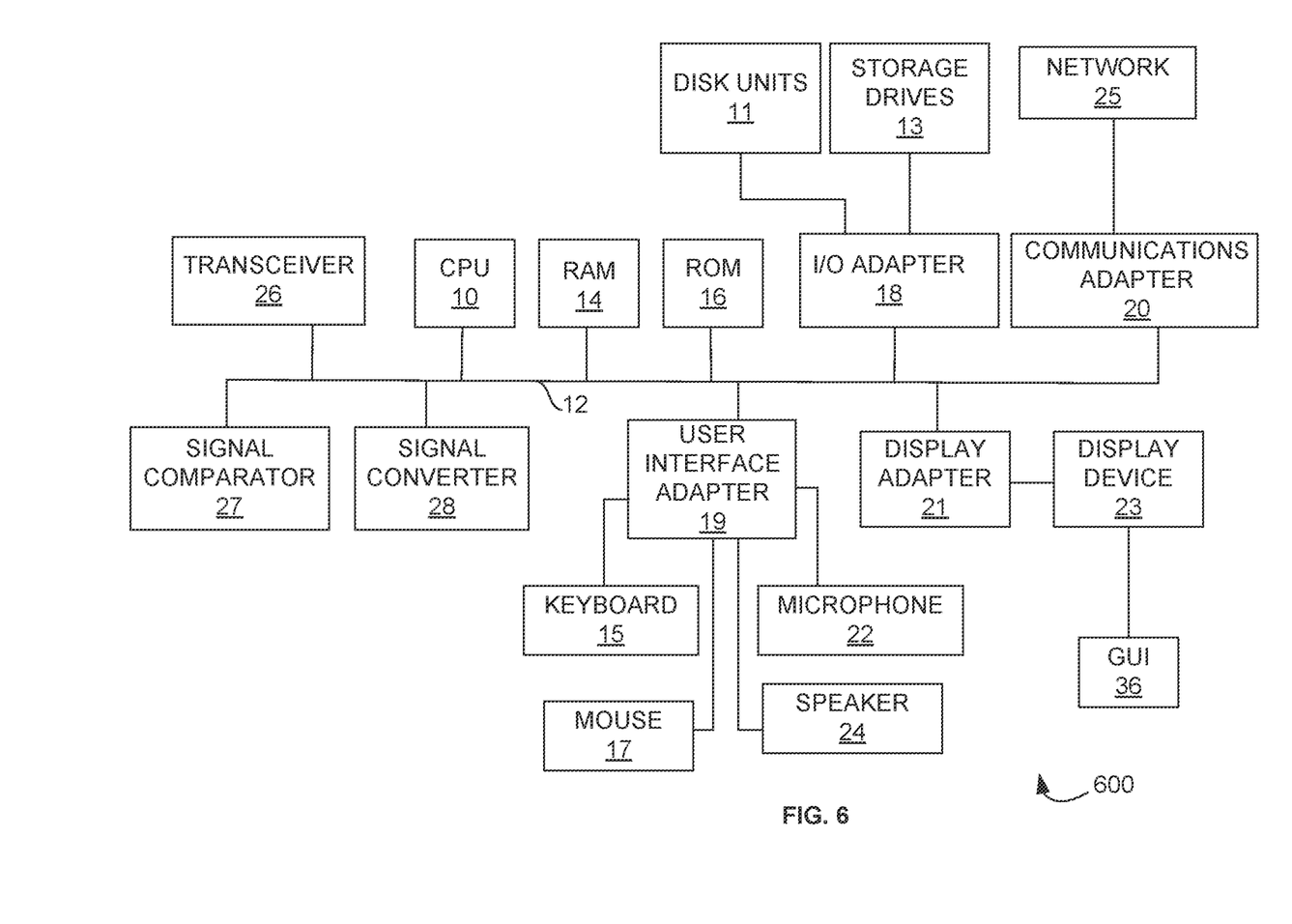
FIG. 6 is a schematic diagram of a computer architecture, in accordance with the embodiments herein.

A representative hardware environment for practicing the embodiments herein is depicted in FIG. 6, with reference to FIGS. 1 through 5. This schematic drawing illustrates a hardware configuration of an information handling/computer system 600 in accordance with the embodiments herein. The system 600 comprises at least one processor or central processing unit (CPU) 10. The CPUs 10 are interconnected via system bus 12 to various devices such as a random-access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system 600 can read the inventive instructions on the program storage devices and follow these instructions to execute the methodology of the embodiments herein. The system 600 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network, and a display adapter 21 connects the bus 12 to a display device 23, which provides a graphical entity interface (GUI) 36 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A non-transitory computer-readable storage medium storing a sequence of instructions, which when executed by a processor, causes synchronization of a publishing web-application and a subscriber web-application, the sequence of instructions comprising:
    registering a hypertext transfer protocol (HTTP) message subscription that is associated with (a) an event that occurs on the publishing web-application and (b) an HTTP message of the publishing web-application sent to the subscriber web-application at the event;
    generating a transformed HTTP message from the HTTP message using the HTTP message subscription associated with the event, wherein the HTTP message subscription is created by:
        generating an extended web URL by augmenting a web URL associated with the HTTP message subscription with an HTTP method identifier,
        transforming a payload associated with the HTTP message from a first format of the publishing web-application to a second format of the subscriber web-application using payload mapping; and
        augmenting the extended web URL by appending a variable with the payload, wherein the variable includes identifier information associated with a data entity that comprises a set of data configured to be stored and accessed on a computer-readable medium; and
    transmitting the transformed HTTP message from the publishing web-application to the subscriber web-application to invoke an API for synchronization of the publishing web-application and the subscriber web-application.

2. The non-transitory computer readable storage medium storing the sequence of instructions of claim 1, which when executed by the processor, further causes in-order transmission of a plurality of transformed HTTP messages based on a subscription group that comprises at least one HTTP message subscription to form an integration between the publishing web-application and a plurality of subscriber web-applications, wherein the plurality of subscriber web-applications receive the transformed HTTP messages from the subscription group.

3. The non-transitory computer readable storage medium storing the sequence of instructions of claim 2, wherein the HTTP message subscription is further created by overwriting the subscription group HTTP header that is associated with the subscription group with the subscription HTTP header that is associated with the HTTP message subscription.

4. The non-transitory computer readable storage medium storing the sequence of instructions of claim 3, wherein the HTTP message subscription is further created by overwriting either the subscription group HTTP header or the subscription HTTP header with the message HTTP header that is associated with the HTTP message.

5. The non-transitory computer readable storage medium storing the sequence of instructions of claim 4, which when executed by the processor, further applies a filter, that is configured in the HTTP message subscription associated with the event, to either the HTTP header or the payload to deliver a transformed HTTP message that qualifies the filter to the subscriber web-application.

6. The non-transitory computer readable storage medium storing the sequence of instructions of claim 1, which when executed by the processor, further creates the data entity at the subscriber web-application upon determining that the data entity is created at the publishing web-application.

7. The non-transitory computer readable storage medium storing the sequence of instructions of claim 1, which when executed by the processor, further updates the data entity at the subscriber web-application upon determining that the data entity is updated at the publishing web-application.

8. The non-transitory computer readable storage medium storing the sequence of instructions of claim 1, wherein registering the HTTP message subscription is performed either by using a web-UI to visually configure the HTTP message subscription, or by using an application programming interface (API).

9. The non-transitory computer readable storage medium storing the sequence of instructions of claim 4, which when executed by the processor, further invokes an endpoint of a representational state transfer application programming interface (REST API) by implementing the HTTP message subscription as a webhook subscription configuration to universally connect the subscriber web-application and the publishing web-application.

10. A transformed message configuration device that causes synchronization of a publishing web-application and a subscriber web-application, the device comprising:
    a processor; and
    a memory that stores a set of instructions, which when executed by the processor, performs:
        registering a hypertext transfer protocol (HTTP) message subscription that is associated with (a) an event that occurs on the publishing web-application and (b) an HTTP message of the publishing web-application sent to the subscriber web-application at the event;
        generating a transformed HTTP message from the HTTP message using the HTTP message subscription associated with the event, wherein the HTTP message subscription is created by:
            generating an extended web URL by augmenting a web URL associated with the HTTP message subscription with an HTTP method identifier;
            transforming a payload associated with the HTTP message from a first format of the publishing web-application to a second format of the subscriber web-application using payload mapping; and
            augmenting the extended web URL by appending a variable with the payload, wherein the variable includes identifier information associated with a data entity that comprises a set of data configured to be stored and accessed on a computer-readable medium; and
        transmitting the transformed HTTP message from the publishing web-application to the subscriber web-application to invoke an API for synchronization of the publishing web-application and the subscriber web-application.

11. The transformed message configuration device of claim 10, wherein the transformed message configuration device performs in-order transmission of a plurality of transformed HTTP messages based on the subscription group that comprises at least one HTTP message subscription to form an integration between the publishing web-application and a plurality of subscriber web-applications, wherein the plurality of subscriber web-applications receive the transformed HTTP messages from the subscription group.

12. The transformed message configuration device of claim 11, wherein the transformed message configuration device creates the HTTP message subscription by over-writing the subscription group HTTP header that is associated with the subscription group with the subscription HTTP header that is associated with the HTTP message subscription.

13. The transformed message configuration device of claim 12, wherein the transformed message configuration device creates the HTTP message subscription by over-writing either the subscription group HTTP header or the subscription HTTP header with the message HTTP header that is associated with the HTTP message.

14. The transformed message configuration device of claim 12, wherein the transformed message configuration device applies a filter that is configured in the HTTP message subscription associated with the event to either the HTTP header or the payload to deliver a transformed HTTP message that qualifies the filter to the subscriber web-application.

15. A method of synchronization of publishing a web-application and a subscriber web-application, the method comprising:
    registering a hypertext transfer protocol (HTTP) message subscription that is associated with (a) an event that occurs on the publishing web-application and (b) an HTTP message of the publishing web-application sent to the subscriber web-application at the event;
    generating a transformed HTTP message from the HTTP message using the HTTP message subscription associated with the event, wherein the HTTP message subscription is created by:
        generating an extended web URL by augmenting a web URL associated with the HTTP message subscription with an HTTP method identifier;
        transforming a payload associated with the HTTP message from a first format of the publishing web-application to a second format of the subscriber web-application using payload mapping; and
        augmenting the extended web URL by appending a variable with the payload, wherein the variable includes identifier information associated with a data entity that comprises a set of data configured to be stored and accessed on a computer-readable medium; and
    transmitting the transformed HTTP message from the publishing web-application to the subscriber web-application to invoke an API for synchronization of the publishing web-application and the subscriber web-application.

16. The method of claim 15, further comprising transmitting a plurality of transformed HTTP messages in-order based on the subscription group that comprises at least one HTTP message subscription to form an integration between the publishing web-application and a plurality of subscriber web-applications, wherein the plurality of subscriber web-applications receive the transformed HTTP messages from the subscription group.

17. The method of claim 16, wherein the HTTP message subscription is further created by over-writing a subscription group HTTP header that is associated with the subscription group with the subscription HTTP header that is associated with the HTTP message subscription.

18. The method of claim 17, wherein the HTTP message subscription is further created by over-writing either the subscription group HTTP header or the subscription HTTP header with the message HTTP header that is associated with the HTTP message.

19. The method of claim 15, further comprising creating the data entity at the subscriber web-application upon determining that the data entity is created at the publishing web-application.

20. The method of claim 15, further comprising updating the data entity at the subscriber web-application upon determining that the data entity is updated at the publishing web-application.

\* \* \* \* \*